US008354463B2

(12) United States Patent
Fever et al.

(10) Patent No.: US 8,354,463 B2
(45) Date of Patent: Jan. 15, 2013

(54) FLAME RETARDANT THERMOPLASTIC ELASTOMERS

(75) Inventors: Vanessa Fever, Drusenheim (FR); Charles Page, Karlsruhe (DE); Diana Weidner, Loffenau (DE)

(73) Assignee: Polyone Corporation, Avon Lake, OH (US)

( * ) Notice: Subject to any disclaimer, the term of this patent is extended or adjusted under 35 U.S.C. 154(b) by 375 days.

(21) Appl. No.: 12/674,540

(22) PCT Filed: Aug. 27, 2008

(86) PCT No.: PCT/US2008/074386
§ 371 (c)(1),
(2), (4) Date: Feb. 22, 2010

(87) PCT Pub. No.: WO2009/029634
PCT Pub. Date: Mar. 5, 2009

(65) Prior Publication Data
US 2011/0136927 A1    Jun. 9, 2011

Related U.S. Application Data

(60) Provisional application No. 60/080,500, filed on Jul. 14, 2008, provisional application No. 60/969,629, filed on Sep. 2, 2007.

(51) Int. Cl.
*C08K 3/32* (2006.01)
*C08K 3/04* (2006.01)

(52) U.S. Cl. ........................................ 524/415; 524/495

(58) Field of Classification Search .................. 524/414, 524/495, 415
See application file for complete search history.

(56) References Cited

U.S. PATENT DOCUMENTS

| 4,483,958 A | 11/1984 | Kosaka et al. |
|---|---|---|
| 5,124,379 A | 6/1992 | Cipolli et al. |
| 5,312,853 A | 5/1994 | Staendeke et al. |
| 5,674,930 A | 10/1997 | Sugiura et al. |
| 5,827,584 A | 10/1998 | Akao et al. |
| 5,877,229 A | 3/1999 | Janke et al. |
| 6,124,394 A * | 9/2000 | Goto et al. ............... 524/495 |
| 6,268,408 B1 | 7/2001 | Dispenza |
| 6,537,472 B2 | 3/2003 | Masubuchi |
| 6,720,363 B2 | 4/2004 | Subramonian et al. |
| 6,730,381 B2 | 5/2004 | Horacek |
| 6,864,315 B1 | 3/2005 | Hakuta et al. |
| 7,029,617 B2 | 4/2006 | Nishimuro et al. |
| 7,232,856 B1 | 6/2007 | Campbell et al. |
| 2003/0031818 A1 | 2/2003 | Horacek |
| 2003/0035912 A1 | 2/2003 | Horacek |
| 2006/0084740 A1 | 4/2006 | Kao et al. |
| 2007/0193996 A1 | 8/2007 | Nakajima et al. |
| 2008/0096988 A1 | 4/2008 | Hahn et al. |
| 2009/0176091 A1 | 7/2009 | Karayianni et al. |

FOREIGN PATENT DOCUMENTS

| EP | 1207183 | 5/2002 |
|---|---|---|
| JP | 2006249364 | 9/2006 |
| KR | 1996-005079 | 4/1996 |
| KR | 10-1999-021573 | 3/1999 |
| KR | 10-0200034 | 6/1999 |
| WO | WO2009/067701 | 5/2009 |
| WO | WO2010/039616 | 4/2010 |
| WO | WO2010/091232 | 8/2010 |
| WO | WO2010/126855 | 11/2010 |

OTHER PUBLICATIONS

Machine Translation of Abstract of KR 1996-005079 (2011).
Machine Translation of Abstract of KR 10-0200034 (2011).
Machine Translation of Abstract of KR 10-1999-021573.

* cited by examiner

*Primary Examiner* — Ling Choi
*Assistant Examiner* — Wenwen Cai
(74) *Attorney, Agent, or Firm* — John H. Hornickel

(57) ABSTRACT

A thermoplastic elastomer (TPE) is disclosed which is flame retardant and essentially halogen-free. An embodiment also includes expandable graphite filler to further provide fire protection.

9 Claims, No Drawings

US 8,354,463 B2

FLAME RETARDANT THERMOPLASTIC ELASTOMERS

CLAIM OF PRIORITY

This application claims priority from U.S. Provisional Patent Application Ser. No. 60/969,629 filed on Sep. 2, 2007, which is incorporated by reference. This application also claims priority from U.S. Provisional Patent Application Ser. No. 61/080,500 filed on Jul. 14, 2008.

FIELD OF THE INVENTION

This invention relates to thermoplastic elastomers, polymer compounds which exhibit elasticity while remaining thermoplastic, which are also flame retardant.

BACKGROUND OF THE INVENTION

The world of polymers has progressed rapidly to transform material science from wood and metals of the $19^{th}$ Century to the use of thermoset polymers of the mid-$20^{th}$ Century to the use of thermoplastic polymers of later $20^{th}$ Century.

Thermoplastic elastomers combine the benefits of elastomeric properties of thermoset polymers, such as vulcanized rubber, with the processing properties of thermoplastic polymers.

For safety reasons in some uses, thermoplastic elastomers should be flame retardant. There is customer demand for essentially non-halogen flame retardant thermoplastic elastomers.

SUMMARY OF THE INVENTION

What the art needs is a new thermoplastic elastomer (also called "TPE") that is flame retardant without the use of brominated flame retardants or chlorinated polyethylene flame retardants or other halogen-containing flame retardants. The art needs an essentially halogen-free flame retardant TPE ("HFFR TPE").

"Essentially halogen-free" means that there is no intention to include any halogen moieties in any of the ingredients of the compound of the present invention, but that one can cannot control trace amounts of impurities that may exist in such ingredients.

Unfortunately, essentially halogen-free flame retardants are very sensitive to processing conditions typically experienced by TPEs. Therefore, there is little predictable to one of ordinary skill in the art in the creation of a HI-FR TPE.

The present invention solves the problem by formulating a HFFR TPE that utilizes ammonium polyphosphate as an essentially halogen-free flame retardant.

One aspect of the invention is an essentially halogen-free thermoplastic elastomer compound, comprising (a) styrene-containing thermoplastic elastomer; (b) an ammonium polyphosphate-containing flame retardant; and optionally (c) plasticizer.

Another aspect of the invention is a plastic article made from the compound.

Another aspect of the invention is an essentially halogen-free thermoplastic compound described above, further comprising expandable graphite filler. This filler can expand in the presence of heat and form a char.

Another aspect of the invention is a plastic article made from the expandable compound described above.

Features of the invention will become apparent with reference to the following embodiments.

EMBODIMENTS OF THE INVENTION

Styrene-Containing TPE

TPEs of the present invention are based on styrene ("TPE-S") and are often compounded with plasticizer, antioxidant, thermal stabilizer, and one or more secondary polymers.

Non-limiting examples of TPE-S include styrene-ethylene-butylene-styrene, styrene-ethylene-propylene-styrene, styrene-ethylene-ethylene/propylene-styrene, styrene-isobutylene-styrene, styrene-butadiene-styrene, styrene-isoprene-styrene, and combinations thereof. These examples of TPE-S may or may not be maleated but have weight average molecular weights in excess of 75,000 and preferably in excess of 200,000. Commercially available grades of these TPE-S compounds are Kraton MD6917ES and Kraton G 1633 from Kraton Polymers and Septon 4077 and Septon 4099 from Kuraray.

Essentially Halogen-Free Flame Retardant

It has been found that flame retardants that contain ammonium polyphosphate are particularly suited to endure the processing conditions employed in compounding TPE-S.

It has been found, particularly, that Exolit AP brand flame retardants from Clariant GmbH of Germany work well in compounds of the present invention. Presently preferred is Exolit AP 766 brand flame retardant.

Optional Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; smoke suppresants; expandable char formers; impact modifiers; initiators; lubricants; micas; pigments, colorants and dyes; plasticizers; processing aids; other polymers; release agents; silanes, titanates and zirconates; slip and anti-blocking agents; stabilizers; stearates; ultraviolet light absorbers; viscosity regulators; waxes; and combinations of them.

Any conventional plasticizer, preferably a paraffinic oil, is suitable for use the present invention.

A preferred secondary polymer for the present invention is polypropylene.

A preferred anti-oxidant is an Irganox brand pentaerythritol antioxidant identified as CAS 6683-19-8.

A preferred thermal stabilizer an Irganox brand thiodipropionate compound identified as CAS 123-28-4.

An expandable graphite filler can serve as an expandable char former in formulations of the compound in those instances when the article formed from the compound should expand as it is heated. The expandable graphite filler should have an onset of expansion temperature greater than the processing temperature of the compound, but low enough and with a high enough activity to provide a suitable expansion. Suitable expansion could be as much as 300%, in an embodiment of a door seal where the gap during normal operation becomes sealed upon onset of exposure to heat or flame. Preferred expandable graphite filler products are commercially available as Nord-Min branded products from Nordmann Rassmann of Germany.

Table 1 shows the acceptable, desirable, and preferable ranges of ingredients for the HFFR-TPE of the present invention.

TABLE 1

Ranges of Ingredients

| Ingredient (Wt. Percent) | Acceptable | Desirable | Preferable |
|---|---|---|---|
| TPE-S | 5-40% | 10-35% | 15-25% |
| Flame retardant containing ammonium polyphosphate | 20-70% | 25-60% | 30-50% |
| Plasticizer | 0-60% | 10-40% | 15-30% |
| Secondary Polymer(s) | 0-30% | 5-25% | 5-20% |
| Anti-oxidant | 0-3% | 0-2% | 0-1% |
| Thermal Stabilizer | 0-3% | 0-2% | 0-1% |
| Expandable graphite filler | 0-30% | 10-25% | 15-20% |
| Other Optional Additives | 0-15% | 0-10% | 0-5% |

Processing

The preparation of compounds of the present invention is uncomplicated once the proper ingredients have been selected. The compound of the present can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 50 to about 500 revolutions per minute (rpm), and preferably from about 100 to about 300 rpm. Typically, the output from the extruder is pelletized for later extrusion or molding into polymeric articles.

Mixing in a batch process typically occurs in a Banbury mixer that is also elevated to a temperature that is sufficient to melt the polymer matrix to permit homogenization of the compound components. The mixing speeds range from 60 to 1000 rpm and temperature of mixing can be ambient. Also, the output from the mixer is chopped into smaller sizes for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

USEFULNESS OF THE INVENTION

TPE-S of the present invention is an excellent versatility because of its elastomeric performance and its thermoplastic processing. The addition of anti-oxidant properties, thermal stabilization, and essentially halogen-free flame retardancy by those respective functional additives makes the HFFR TPE of the present invention an excellent compound for molding into plastic articles which need flame retardancy when in use in enclosed spaces. Use in motor vehicle passenger compartments and aircraft passenger compartments are two of many ways the compounds of the present invention can benefit people around the world.

EXAMPLES

Table 2 shows seven examples of the present invention, their formulations, sources of ingredients, and processing conditions.

TABLE 2

Formulations and Processing Conditions

| Ingredient Name (Wt. Parts) | 1 | 2 | 3 | 4 | 5 | 6 | 7 |
|---|---|---|---|---|---|---|---|
| Kraton MD6917ES SEBS (Kraton) | 21.5 | 21.5 | 23.5 | 25.0 | 20.0 | 23.0 | 24.0 |
| BP 401-NA06 PP copolymer (Ineos) | 17.0 | 17.0 | 18.0 | 5.0 | 11.0 | 13.0 | 20.0 |
| Primol 382 oil (Exxon/Mobil) | 21.5 | 21.5 | 23.5 | 30.0 | 29.0 | 27.0 | 21.0 |
| Exolit AP766 flame retardant (Clariant) | 40.0 | 40.0 | 35.0 | 40.0 | 40.0 | 37.0 | 35.0 |
| Irganox 1010 anti-oxidant (Ciba) | 0.2 | 0.2 | 0.2 | 0.2 | 0.2 | 0.2 | 0.2 |
| Irganox PS800 thermal stabilizer (Ciba) | 0.2 | 0.2 | 0.2 | 0.2 | 0.2 | 0.2 | 0.2 |
| Mixing Equipment | W&P ZE25 twin screw compounder | | | | | | |
| Mixing Temp. progressing through the Zones (° C.) | 160-185 | 160-185 | 160-185 | 160-170 | 160-170 | 160-170 | 160-170 |
| Mixing Speed (rpm) | | | | 320 | | | |
| Plasticizer amount added at the injection port (%) | 9.5% | 9.5% | 10% | 15% | 14% | 10% | 10% |
| Form of Product After Mixing | | | | Pellets | | | |

Pellets of all Examples 1-7 were molded into tensile test bars using a Demag injection molding machine, operating at 160-180° C. temperature and medium-high pressure.

Table 3 shows the experimental results.

TABLE 3

Test Results

| | Test | | | | | | |
|---|---|---|---|---|---|---|---|
| | 1 | 2 | 3 | 4 | 5 | 6 | 7 |
| Density (DIN 53479) g/cm$^3$ | 1.10 | 1.097 | 1.062 | 1.084 | 1.081 | 1.069 | 1.059 |
| Shore Durometer (DIN 53505) Shore A | 85 | 87 | 81 | 47 | 65 | 74 | 87 |
| Tensile Strength (DIN 53504) | 5.1 MPa | 5.1 MPa | 5.5 MPa | 2.6 MPa | 3.1 MPa | 4 MPa | 6.2 MPa |
| Elongation at break (DIN 53504) | 420% | 420% | 455% | 380% | 420% | 350% | 340% |
| Compression Set (DIN 53 517) | 59% | 59% | 55% | 44% | 49% | | |
| Melt Flow Index (190° C./5 Kg) (DIN EN ISO 1133) g/10 min | 2.3 | 3.1 | 2.3 | 0.3 | 4.7 | 2.4 | 2.9 |
| Flame Resistance UL94@0.8 mm (UL94) | | V-2 | | | | | |
| Flame Resistance UL94@1.5 mm (UL94) | V-0 | V-0 | V-0 | V-0 | V-0 | V-0 | V-0 |
| Flame Resistance UL94@3 mm (UL94) | | V-0 | | | | | |
| Glow-wire @0.8 mm (IEC 695-2-1) | | 960° C. | | | | | |
| Glow-wire @1.5 mm (IEC 695-2-1) | 960° C. | | | | | | |
| Glow-wire @2 mm (IEC 695-2-1) | | 960° C. | 960° C. | 960° C. | 960° C. | 960° C. | 960° C. |
| Glow-wire @3 mm (IEC 695-2-1) | | 960° C. | | | | | |

Examples 1-7 exhibit a variety of hardnesses as well as excellent flame retardancy using an essentially halogen-free flame retardant compound. Not only were the compounds easy to process, a manufacturing requirement, but also the compounds showed excellent performance. All of the compounds met the UL-94-VO test at 1.5 mm and passed the IEC695-2-1 glow wire test at 960° C. at 2 mm.

Table 4 shows the formulations and processing conditions for an embodiment of the invention where expandable graphite filler is also used. Examples 9 and 10 differ from Example 8 because they contain expandable graphite filler.

TABLE 4

Formulations and Processing Conditions

| Ingredients (Wt. %) | 8 | 9 | 10 |
|---|---|---|---|
| Kraton G 1651 SEBS (Kraton) | 27.24 | 0.00 | 21.71 |
| Kraton G 1654 SEBS (Kraton) | 0.00 | 27.78 | 0.00 |
| BP 100-GB06 polypropylene homopolymer (Ineos) | 10.09 | 10.91 | 0.00 |
| BP 101-YA35 polypropylene homopolymer (Ineos) | 0.00 | 5.95 | 0.00 |
| Primol 382 paraffinic white oil (ExxonMobil) | 25.22 | 39.69 | 23.88 |
| Exolit AP766 flame retardant (Clariant) | 37.33 | 0.00 | 32.57 |
| Nord Min 503 expandable graphite (Nordmann Rassmann) | 0.00 | 14.88 | 0.00 |
| Nord Min 249 expandable graphite (Nordmann Rassmann) | 0.00 | 0.00 | 21.71 |
| Anox 20 tetrakismethylene anti-oxidant (Chemtura) | 0.11 | 0.11 | 0.12 |
| Epikote 1004 epoxy resin (Hercules) | 0.00 | 0.42 | 0.00 |
| Uvinul 3027 benzotriazole (BASF) | 0.00 | 0.26 | 0.00 |
| Mixing Equipment | W&P ZE25 twin screw compounder | | |
| Mixing Temp. | 150-170° C. | | |
| Mixing Speed | 320 rpm | | |

TABLE 4-continued

Formulations and Processing Conditions

| Ingredients (Wt. %) | 8 | 9 | 10 |
|---|---|---|---|
| Plasticizer amount added at the injection port (%) | 10% | 15% | 10% |
| Form of Product After Mixing | | Pellets | |

Table 5 shows the test results.

TABLE 5

| | | Test Results | | |
|---|---|---|---|---|
| Test | Test Method | 8 | 9 | 10 |
| Hardness, Shore A | DIN 53 505 | 75 | 70 | 83 |
| Density (g/cm$^3$) | DIN 53479-A | 1.07 | 0.977 | 1.189 |
| Tensile Strength (MPa) | DIN 53 504 | 5.3 | 5.1 | 2.9 |
| Elongation at Break (%) | DIN 53 504 | 375 | 530 | 200 |
| UL 94 @ 1.5 mm | UL 94 | V-0 | HB | V-0 |
| Glow Wire @ 2 mm | IEC 695-2-1 | 960° C. | — | 960° C. |
| Expansion Volume | At 300° C. after 20 min | 15% | 190% | >400% |

Example 9 has 190% expansion, and Example 10 has over 400% expansion.

Example 10 would be particularly suitable in the form of a seal for a fire door between the door leaf and door frame. In order to cover the gap between the leaf and the frame, that seal would need to expand during a fire. The expansion over the gap, which could be up to 5 mm, as compared to the dimension of the seal, considering present seal designs, could be at least 300%. A door seal made from the compound of Example 10 is expandable in the presence of heat at least 300% over its dimension when not heated. That expansion would cover a door gap during a fire, leading to better fire protection of life and property.

The invention is not limited to the above embodiments. The claims follow.

The invention claimed is:

1. An essentially halogen-free thermoplastic elastomer compound, comprising:
   (a) styrene-containing thermoplastic elastomer;
   (b) an ammonium polyphosphate-containing flame retardant;
   (c) expandable graphite filler;
   (d) plasticizer; and
   (e) polypropylene;
   wherein the styrene-containing thermoplastic elastomer is selected from the group consisting of styrene-ethylene-butylene-styrene, styrene-ethylene-propylene-styrene, styrene-ethylene-ethylene/propylene-styrene, styrene-isobutylene-styrene, styrene-butadiene-styrene, styrene-isoprene-styrene, and combinations thereof; and
   wherein weight percents of the ingredients comprise

| | |
|---|---|
| Styrene-containing thermoplastic elastomer | 10-35% |
| Flame retardant containing ammonium polyphosphate | 25-60% |
| Plasticizer | 10-40% |
| Polypropylene(s) | 5-25% |
| Expandable graphite filler | 10-25% |
| Anti-oxidant | 0-2% |
| Thermal Stabilizer | 0-2% |
| Other Optional Additives | 0-10%. |

2. The compound of claim 1, wherein the styrene-containing thermoplastic elastomer has a weight average molecular weight of at least 200,000.

3. The compound of claim 1, wherein the styrene-containing thermoplastic elastomer is not maleated but has a weight average molecular weight in excess of 75,000.

4. The compound of claim 1, wherein the plasticizer is a paraffinic oil.

5. The compound of claim 1, further comprising adhesion promoters; biocides; anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; additional processing aids; release agents; silanes, titanates and zirconates; slip and anti-blocking agents; stabilizers; stearates; ultraviolet light absorbers; viscosity regulators; waxes; and combinations of them.

6. The compound of claim 1, wherein the weight percents of the ingredients comprise:

| | |
|---|---|
| Styrene-containing thermoplastic elastomer | 15-25% |
| Flame retardant containing ammonium polyphosphate | 30-50% |
| Plasticizer | 15-30% |
| Polypropylene(s) | 5-20% |
| Anti-oxidant | 0-1% |
| Thermal Stabilizer | 0-1% |
| Expandable graphite filler | 15-20% |
| Other Optional Additives | 0-5%. |

7. A thermoplastic article, comprising the compound of claim 1.

8. A thermoplastic article, comprising the compound of claim 7, wherein the article is expandable in the presence of heat.

9. The thermoplastic article of claim 8, wherein the article is in the shape of a door seal and is expandable in the presence of heat at least 300% over its dimension when not heated.

* * * * *